United States Patent [19]

Braun et al.

[11] Patent Number: 5,065,568
[45] Date of Patent: Nov. 19, 1991

[54] MOWER DECK HEIGHT ADJUSTMENT MECHANISM

[75] Inventors: Stephen A. Braun, Horicon; Michael J. O'Neill, Mayville, both of Wis.; Donald L. Cutshall, Burnsville, Minn.

[73] Assignee: Deere & Company, Moline, Ill.

[21] Appl. No.: 558,045

[22] Filed: Jul. 26, 1990

[51] Int. Cl.$^5$ .................. A01D 34/64; A01D 34/68
[52] U.S. Cl. ......................... 56/14.9; 56/17.1; 56/DIG. 9; 56/DIG. 14
[58] Field of Search .............. 56/14.9, 17.1, 17.2, 56/DIG. 3, DIG. 9, DIG. 10, DIG. 14, DIG. 22; 280/43.13

[56] References Cited

U.S. PATENT DOCUMENTS

| | | | |
|---|---|---|---|
| 3,755,998 | 9/1973 | Hoffmeyer | 56/255 |
| 4,325,211 | 4/1982 | Witt et al. | 56/15.8 |
| 4,441,306 | 4/1984 | Kuhn | 56/15.9 |
| 4,700,536 | 10/1987 | Torras | 56/15.8 |
| 4,704,848 | 11/1987 | Nannen | 56/17.2 |
| 4,715,168 | 12/1987 | Oxley | 56/15.8 |
| 4,747,257 | 5/1988 | Hutchison | 56/15.8 |
| 4,760,687 | 8/1988 | Siegrist | 56/15.8 |
| 4,835,952 | 6/1989 | McLane | 56/17.2 |

OTHER PUBLICATIONS

John Deere Horicon Works; entitled "F510 and F525 Front Mowers"; published in the United States in 1988; front cover, inside cover, and pp. 49 and 50.

John Deere Horicon Works: entitled "John Deere Front Mowers for Residential Use"; published in the United States in 1988; front page.

John Deere Horicon Works; entitled "48 and 52-Inch Commercial Walk-Behind Mowers Operator's Manual"; published in the United States in 1988; front cover, inside cover, and pp. 14 and 15.

Hesston Corporation; entitled "Woods Mow'n Machine"; published in the United States in 1988; front cover, and pp. 2 and 3.

Primary Examiner—Terry L. Melius

[57] ABSTRACT

A mower deck height adjustment mechanism having a frame coupled to a rear base unit having driven wheels. Ground engaging wheels support the frame, and a deck is coupled to the frame. A crank handle is coupled to a transverse bar that is fixed to a lower parallel member. The operator turns the crank handle to pivot the bar and lower parallel member to thereby raise and lower the front of the deck. A bell crank couples the rear of the deck to the crank handle. The bell crank is carried by and shifts vertically with a connecting member supported by the front of the deck. As the front of the deck shifts vertically, the connecting member, bell crank, and rear portion of the deck also shift vertically. The bell crank is also operatively coupled with the bar for pivoting therewith, which also causes the rear portion of the deck to shift vertically.

20 Claims, 5 Drawing Sheets

MOWER DECK HEIGHT ADJUSTMENT MECHANISM

BACKGROUND OF THE INVENTION

1. Field of the Invention

The invention relates to a mechanism for selectively adjusting the cutting height of a walk-behind mower deck.

2. Description of the Prior Art

The present invention relates to large walk-behind mowers having a rear powered portion or base unit with driven wheels to propel the mower forwardly. The powered portion pushes a frame that carries a mower deck for cutting vegetation. The front of the frame is typically supported by caster wheels. An operator walks behind the powered portion while manipulating controls to vary the speed and direction of the mowing vehicle. These large walk behind mowers are generally more maneuverable than rider mowers and are often used in commercial settings such as large corporate grounds and golf courses where mower maneuverability is advantageous.

Conventional mowers of this type often provide mechanisms for adjusting the height of the deck above the ground to vary the height of cut. One type of conventional mower provides washers or spacers that can be inserted between the frame and the caster wheels to raise the deck relative to the ground. These spacers can also be removed to lower the deck. The operator must lift the front portion of the vehicle to allow for the removal or insertion of spacers. Tools may be required when adjusting spacers. The operator must remove or insert spacers at the various caster wheel locations to keep the mower deck level.

Another type of conventional mower provides pin members or screws that are adjustable to vary the height of the deck. A vertical plate having a plurality of openings is fixed to the deck and abuts a vertical plate fixed to the frame that also defines at least one opening. The pin member is held within one of the openings in the deck plate and the opening in the frame plate to hold the deck at a fixed height above the ground. The height of the deck can be adjusted by removing the pin, raising or lowering the deck, and placing the pin through the frame plate opening and a different opening in the deck plate. The deck height adjustment operation may not require the use of any tools, but does require the operator to physically lift the deck. The operator must change the pin positioning at various locations around the vehicle to keep the deck level. Also, this type of mower does not allow for infinite or fine adjustment of the deck height, since the openings are defined at particular locations.

Many mowing vehicles on which an operator rides provide front mounted mower decks whose height can be adjusted. Some of these rider mowers provide a system of spacers or pins as mentioned above.

Another type of rider mower provides a front mounted deck whose height is adjusted when the operator turns a crank handle. Push arms pinned to the front of the vehicle extend forwardly and are pinned to the top of the deck. The push arms act to push the deck forward during operation. Wheels coupled with the front of the deck hold the deck above the ground. The pin connections define an axis transverse to the direction of travel of the vehicle and about which the push arms and deck can pivot. Therefore, as the deck encounters irregular ground conditions, the pin connections allow the deck to pivot upwardly or downwardly with respect to the vehicle in order to ride over the ground irregularity. A crank handle operatively coupled to a transversely extending shaft is engagable by the operator to vary the deck height. The shaft is coupled with a four-bar linkage that extends between the deck and the front caster wheels, such that as the shaft rotates due to turning of the crank handle the height of the deck is changed. The push arms swing upwardly or downwardly, respectively, about the pin connection to the vehicle, as the deck is raised or lowered. A bell crank serves to link the shaft with the rear of the deck, and is pivotally carried by a bar fixed between the push arms. As the shaft pivots in response to the crank being turned, the bell crank will pivot to raise or lower the rear of the deck. Since the bell crank is carried by the push arms via the bar, the entire bell crank rises and falls with the push arms as the deck height is adjusted. The rising and falling of the bell crank also acts to raise and lower the rear portion of the deck. The vertical movement of the bell crank with the push arms therefore produces a portion of the total vertical movement of the rear of the deck during adjustment. The remaining portion of the movement of the rear of the deck is caused by the pivoting of the bell crank as the shaft rotates. Since the pivoting of the bell crank need only move the rear of the deck a portion of the total distance desired, the size and geometry of the bell crank is reduced and the mechanism's compactness and economy of manufacture is therefore improved.

However, the riding mower described above is not readily adaptable for use on a walk-behind mower. Rider mowers are multi-wheeled vehicles that remain upright regardless of whether a mower deck is attached. The powered units of large walk-behind mowers have only two wheels and rely on their connection with the front frame, deck, and front caster wheels to remain upright. The push arms of the rider mower are pinned to the multi-wheeled rear portion. Simply connecting the rider mower deck mechanism to the rear powered portion of the walk-behind mower via pin connections with the push arms would not serve to maintain the rear portion in an upright position. Rather, the rear portion would fall backwardly by rotating about the pin connection with the push arms. Furthermore, disadvantages exist in merely making the pin connection of the rider mowers rigid to adapt the rider's height adjustment mechanism for use with the walk-behind power unit. The push arms would still rise and fall as the front deck height is adjusted, which would cause the power unit to pivot about the drive wheels. Therefore, the operator handles fixed with the power unit would swing upwardly and downwardly about the drive wheels as the deck height is adjusted. It would be disadvantageous for the operator handles to be at various different heights, some of which may be uncomfortable for the operator, as the deck is adjusted.

It would be desirable to provide a powered walk behind mower with a mechanism for adjusting the height of the mower deck from a single station such that the deck remains generally level regardless of the height the operator selects. It would also be desirable for the operator to be able to infinitely adjust the height of the deck without the use of tools. In addition, such a mower should be compact such that the deck can fit beneath obstructions such as fences and bushes to facilitate trimming operations. It would also be desirable for such a mower to possess an anti-scalp feature such that the rear portion of the deck can rise up over irregular ground conditions.

SUMMARY OF THE INVENTION

The preferred embodiment of the present invention provides a rear powered portion behind which an operator walks. Push arms are fixed to the powered portion and are prevented from pivoting up or down together about their connection with the powered portion. Caster wheels are coupled to the push arms via pin connections. Four-bar linkages extend from the caster wheels to support the front portion of the deck. A crank handle is coupled to the four-bar linkages via a transversely extending bar, and can be turned by the operator to adjust the height of the front of the deck. The crank handle is also coupled to the rear portion of the deck for simultaneous adjustment of the deck's rear portion. A bell crank carried by a connecting member pivots as the crank handle is turned, and thereby causes the rear of the deck to be raised or lowered. The bell crank is carried by a connecting member that shifts vertically as the front of the deck shifts. Therefore, the bell crank itself rises or falls as the front portion of the deck shifts vertically. The rear portion of the deck that is linked to the bell crank is thereby caused to rise and fall as the bell crank moves vertically. Therefore, the rising and falling of the bell crank itself causes a portion of the vertical motion of the rear of the deck, and the pivoting of the bell crank causes the remainder of the vertical shifting of the rear of the deck.

DETAILED DESCRIPTION OF THE PREFERRED EMBODIMENT

Figure 1:
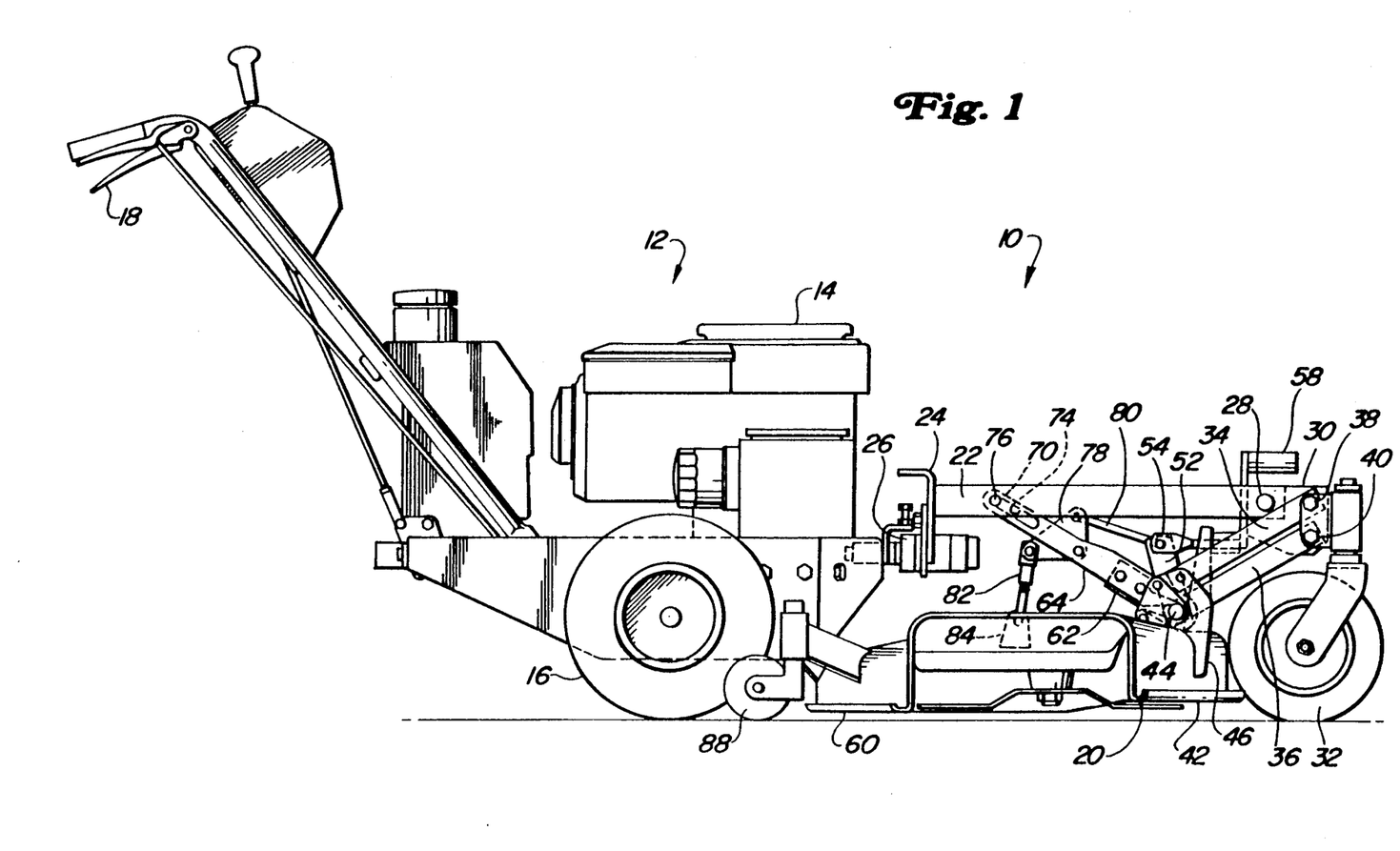
FIG. 1 is a side view of the present invention.
Figure 2:
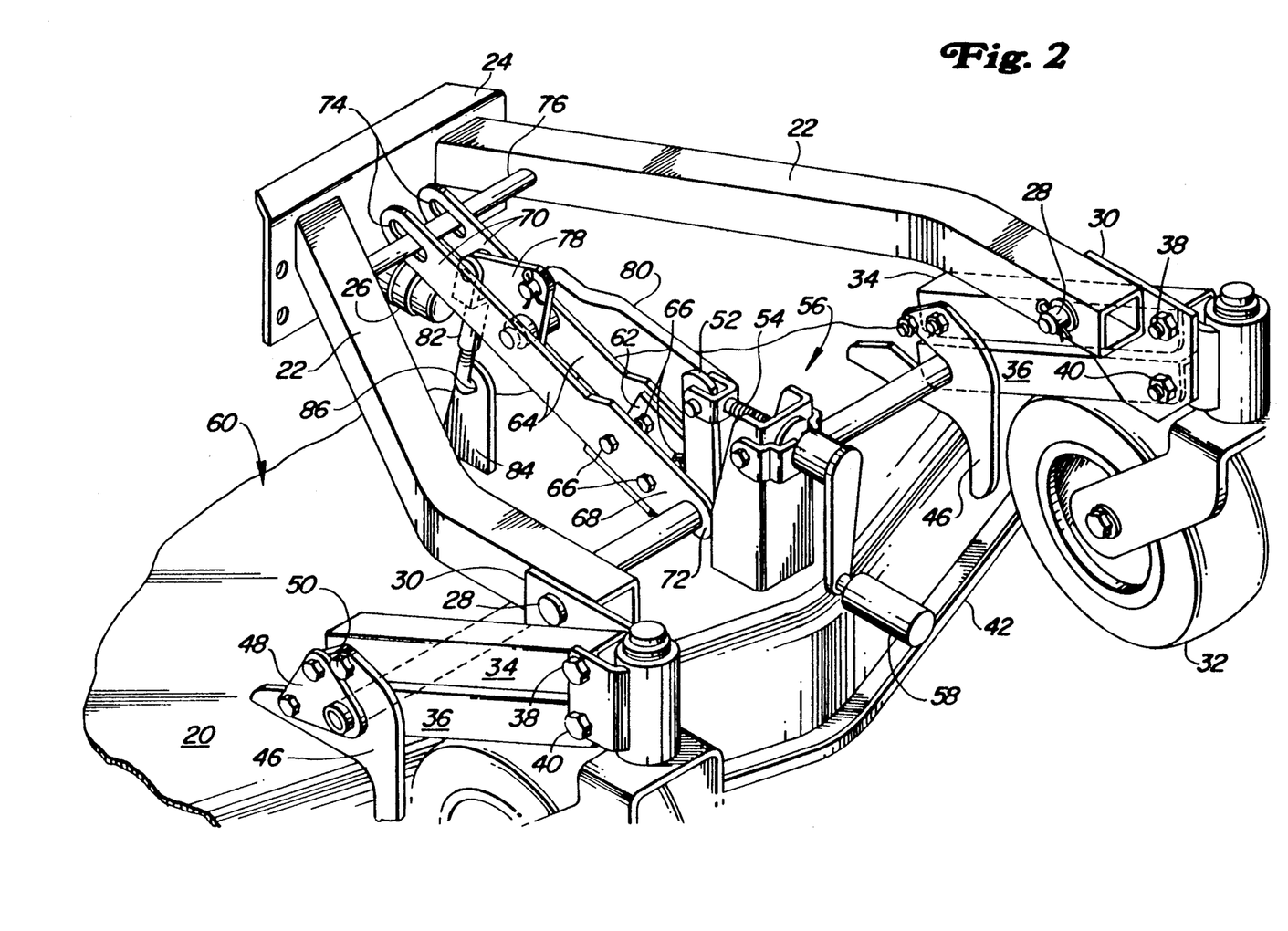
FIG. 2 is perspective view of the front portion of a mower according to the present invention.

Referring now to FIGS. 1 and 2, there is shown the preferred embodiment of the present invention. A walk behind mower 10 is provided having a base unit or rear powered portion 12 with an engine 14 and ground engaging driven wheels 16. An operator walks behind the mower 10 at an operator station while operating controls 18 to selectively drive the ground engaging driven wheels 16. The operator steers the mower 10 by manipulating the controls 18 to slow one of the drive wheels 16, thereby causing the mower 10 to execute a turn about the slowed wheel.

At the front of the mower 10 is provided means for mowing or cutting vegetation. A mower deck 20 within which vegetation is cut is pushed ahead of the rear powered portion 12. A structure is provided for coupling the deck 20 with the powered portion 12 such that the height of the deck 20 can be selectively adjusted by the operator. Push arms 22 extend forwardly from a plate 24 that is coupled with a pivot mechanism 26 carried by the powered portion 12. The push arms 22 and plate 24 pivot about the longitudinal axis defined by the pivot mechanism 26, and are not capable of pivoting up and down together about a transverse axis. The push arms 22 extend forwardly to be coupled via pin connections 28 to front plates 30. The front plates 30 are bolted to caster wheels 32. The push arms 22, front plates 30 and caster wheels 32 form a frame from which the mower deck 20 depends. First support members or lower parallel members 36, and second support members or upper parallel members 34 are pivotally coupled to the front plates 30 via respective bolts 38, 40 and extend rearwardly to support a first or front portion 42 of the mower deck 20. The lower parallel members 36 are welded or otherwise rigidly fixed to a laterally extending shaft or bar 44 that is pivotally received within hook brackets 46 welded to the front 42 of the deck 20. Triangular plates 48 bolted to the hook brackets 46 pivotally receive the bar 44, and act to pivotally secure the bar 44 within the hook brackets 46. The upper parallel members 34 are pinned via bolt connections 50 to the hook brackets 46. An arm or finger member 52 rigidly fixed to the bar 44 is coupled with a threaded member 54 that shifts fore and aft as the operator turns a crank handle mechanism 56 carried at the front 42 of the deck 20. The deck 20 is raised or lowered as the operator turns the crank handle 58. Turning of the crank handle 58 causes the threaded member 54 to shift fore or aft, which causes the finger member 52 and bar 44 to pivot about the longitudinal axis of the bar 44. The lower parallel members 36 fixed to the bar 44 are therefore caused to pivot about their respective bolt connections 40 with the front plates 30. The height of the front portion 42 of the mower deck 20 is thereby caused to be adjusted.

A second or rear portion 60 of the deck 20 is operatively connected with the crank handle 58 such that the rear 60 of the deck 20 shifts vertically to remain generally level with the front portion 42 of the deck 20 as the operator turns the crank handle 58. A U-shaped member 62 abuts the bar 44 and carries two connecting members 64 in spaced relation to each other. Bolts 66 couple the connecting members 64 to the U-shaped member 62. The connecting members 64 have first or front portions 68, and second or rear portions 70. The front portions 68 define hooked portions 72 that wrap around the bar 44. The hooked portions 72 and the U-shaped member 62 therefore act to loosely couple the connecting members 64 with the bar 44 such that the bar 44 can rotate without causing the connecting members 64 to rotate therewith. The rear portion 70 of the connecting members 64 define lost motion means or slots 74 that receive a rod 76 that extends between the two push arms 22. The rod 76 supports the rear portion 70 of the connecting members 64. A bell crank 78 is pivotally carried by the connecting members 64 between the slots 74 and the bar 44. A first linkage member 80 is coupled with the bell crank 78 and extends forwardly to be pivotally coupled with the finger member 52 and crank mechanism 56. A second linkage member 82 is also coupled with the bell crank 78 and extends downwardly to become coupled with the rear portion 60 of the deck 20. A protruding member 84 is fixed to the rear portion 60 of the deck 20 for receiving the second linkage 82. The preferred embodiment of the present invention provides an opening 86 in the protruding member 84 for receiving the second linkage 82. The opening 86 of the preferred embodiment allows for the pivoting of the second linkage, but does not provide for a lost motion coupling therebetween. Another embodiment provides a downwardly extending slotted opening that pivotally and slidably receives the second linkage 82.

Next, the operation of the present invention will be discussed. When the operator wishes to adjust the height of the mower deck 20 he must turn the crank handle 58. Turning the crank handle 58 acts to pivot the finger member 52 forwardly or rearwardly, depending on which direction the crank handle 58 is turned. This causes the bar 44 to which the finger member 52 is fixed to pivot about its longitudinal axis. The lower parallel members 36 rigidly fixed to the bar 44 will therefore pivot with the bar 44. However, the forward ends of the lower parallel members 36 are bolted to the front plates 30. Therefore, the pivotal movement of the lower parallel members 36 with the bar 44 also causes the lower parallel members 36 to swing up or down about their bolt connections 40 with the front plates 30. The rear portion of the parallel members 34, 36 therefore shift up or down as the bar 44 rotates. Since the front portion 42 of the deck 20 is coupled with the rear portions of the lower parallel members 36 via the hook brackets 46 and bar 44, the front portion 42 of the deck 20 will rise and fall with the rear portions of the lower parallel members 36. The upper and lower parallel members 34, 36 act as a four-bar linkage such that the deck 20 will remain generally level as the height of the front portion 42 of the deck 20 is adjusted. The four-bar linkage also acts to keep the caster wheels 32 generally upright as the lower parallel members 36 pivot.

To supplement the ability of the four-bar linkage to keep the deck 20 level, a mechanism is provided for positively shifting the rear portion 60 of the deck 20 vertically, such that the rear deck height corresponds with the height of the front portion 42 of the deck 20. This is accomplished by a linkage that extends between the rear portion 60 of the deck 20 and the crank handle 58. Vegetation is thereby cut more evenly. As the crank handle 58 is turned, the finger member 52 pivots forwardly or rearwardly about the axis of the bar 44. The first linkage 80 will thereby be shifted forwardly or rearwardly, respectively. The bell crank 78 will pivot about its pin connection with the connecting members 64 in response to the shifting of the first linkage 80. The pivoting motion of the bell crank 78 causes the second linkage 82 to shift upwardly or downwardly, thereby respectively raising or lowering the rear portion 60 of the deck 20 above the ground.

Figure 3:
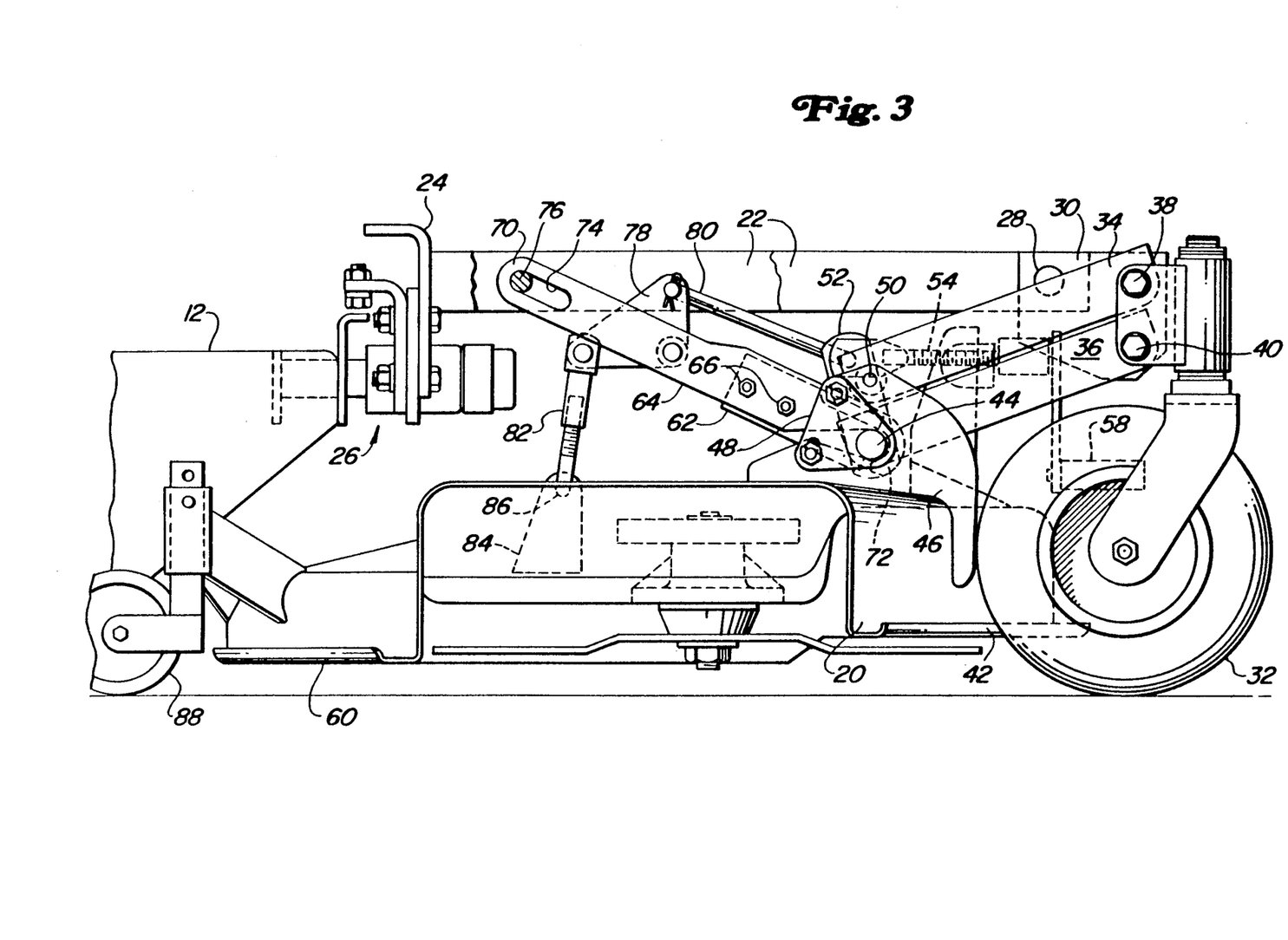
FIG. 3 shows a side view of the present invention in a lowered position.
Figure 4:
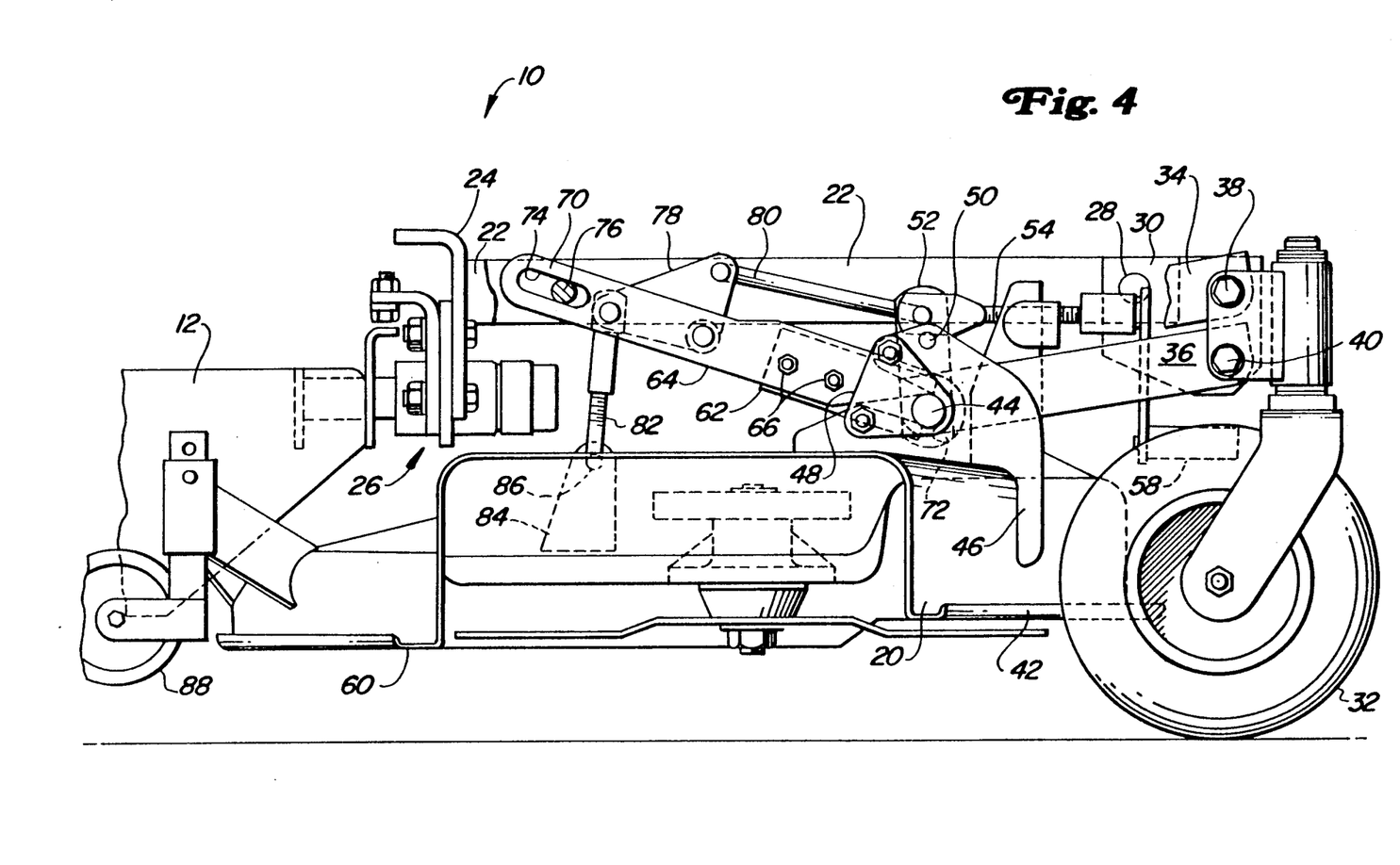
FIG. 4 shows a side view of the present invention in a raised position.
Figure 5:
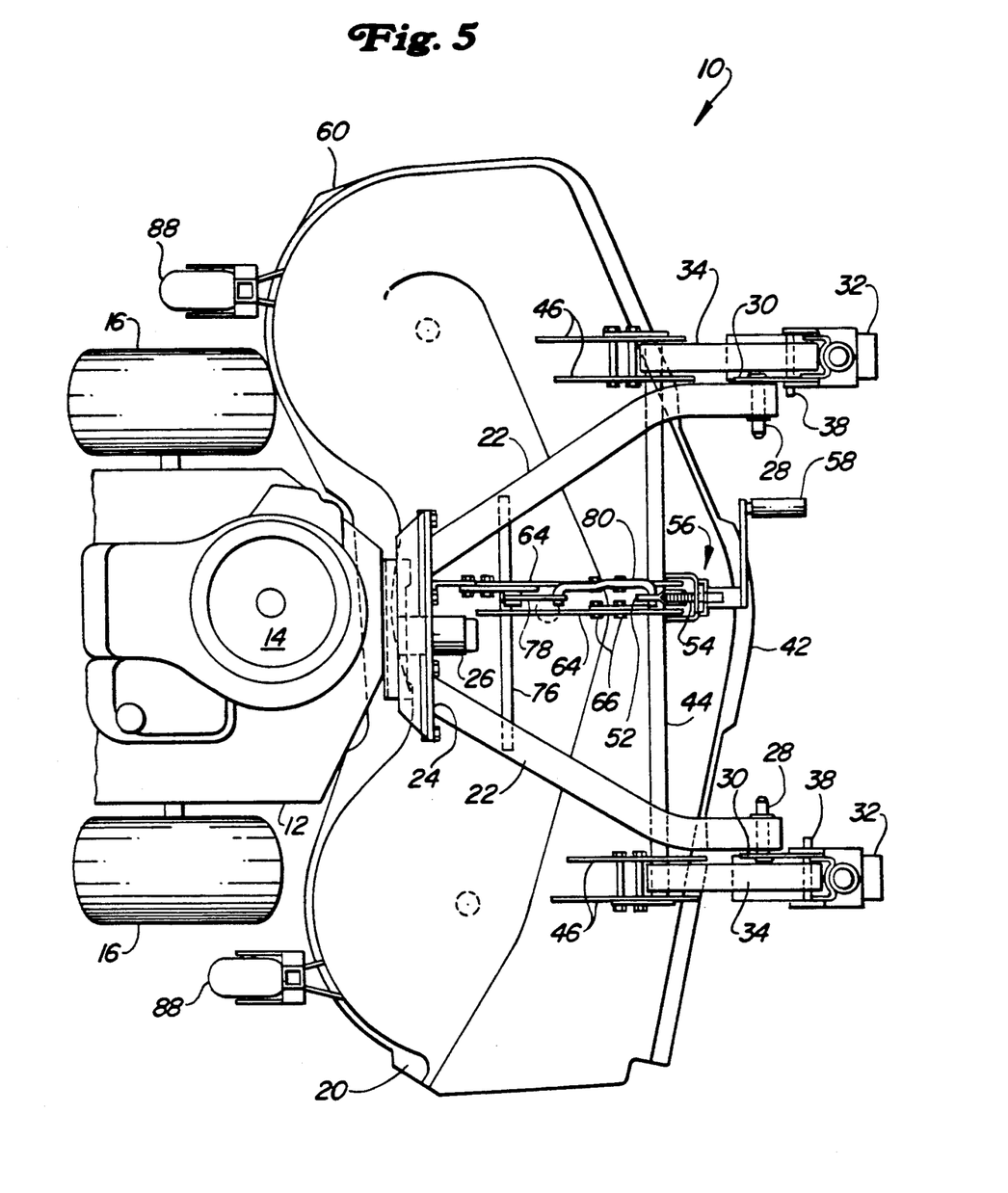
FIG. 5 is a top view of the present invention.

Only a portion of the total distance that the rear 60 of the deck 20 is raised or lowered is attributable to the pivoting of the bell crank 78. When the front 42 of the deck 20 is raised or lowered in response to the crank handle 58 being turned, the front portions 68 of the connecting members 64 shift upwardly or downwardly with the bar 44. The slots 74 formed in the rear portions 70 of the connecting members 64 allow the connecting members 64 to shift and pivot with respect to the rod 76 as the front portion 68 of the connecting members 64 rise and fall with the bar 44. Since the bell crank 78 is pivotally carried by the connecting members 64, the raising and lowering of the front portion 68 of the connecting members 64 acts to raise and lower the bell crank 78. Since the rear portion 60 of the deck 20 is coupled to the bell crank 78, the rising and falling of the entire bell crank 78 causes the rear portion 60 of the deck 20 to rise and fall. Therefore, a portion of the vertical shifting of the rear portion 60 of the deck 20 is due to vertical shifting of the bell crank 78 associated with the movement of the connecting members 64. The remainder of the vertical movement of the rear 60 of the deck 20 is associated with the pivoting of the bell crank 78 about its mounting with the connecting members 64. The geometry and size of the bell crank 78 of the present invention is therefore relatively small since the pivoting of the bell crank 78 accomplishes only a portion of the total displacement of the rear 60 of the deck 20. The small size of the bell crank 78 allows for compact construction of the height adjustment mechanism such that the mower deck 20 is maneuverable under fences, bushes, and other obstructions. The smaller size of the bell crank 78 mechanism also allows for lowered manufacturing costs. In addition, since the rear portion 60 of the deck 20 is coupled with the crank handle 58 for height adjustment, the operator can adjust the height of the entire deck 20 from a single station. The operator is therefore not required to move to various locations around the mower 10 to evenly adjust the height of the entire deck 20. The deck height adjustment mechanism according to the preferred embodiment is shown in a lowered configuration in FIG. 3, and in a raised position in FIG. 4.

During mowing operations, the pivot mechanism 26 that couples the push arms 22 with the rear powered unit 12 allows the push arms 22 and deck 20 to pivot about the axis defined by the pivot 26. This axis is longitudinally aligned with the direction of travel. As one of the caster wheels 32 encounters a bump, the pivot 26 allows the caster wheel 32 and deck 20 to ride up and over the bump to facilitate a more even cut. The deck 20 will therefore pivot with respect to the powered unit 12 about a longitudinal axis. The pivot mechanism 26 does not allow the push arms 22 and deck 20 to pivot about a transverse axis, as conventional riding mower mechanisms do. The preferred embodiment of the present invention allows the push arms 22 to pivot about a longitudinal axis. However, the push arms 22 according to the present invention could also be rigidly attached to the rear powered unit 12 without a pivot mechanism 26 such that pivoting about longitudinal as well as transverse axes is prevented.

The height adjustment mechanism according to the present invention also allows the rear portion 60 of the mower deck 20 to ride up and over irregularities in ground conditions so that the rear 60 of the deck 20 will not gouge or scrape the ground. Gage wheels 88 are mounted to the rear portion 60 of the deck 20 near the outer edges of the deck 20. These gage wheels 88 engage the bumps or irregularities in ground conditions and act to push the rear 60 of the deck 20 up and over the bump. As the rear 60 of the deck 20 shifts upwardly over the bump, the deck 20, crank handle 58, finger member 52, bar 44, upper and lower parallel members 34, 36, caster wheels 32 and front plates 30 all remain rigidly interconnected and pivot together about the front plates' pin connections 28 with the push arms 22.

As the rear 60 of the deck 20 tilts upwardly to pass over a bump, the front portions 68 of the connecting members 64 will shift upwardly and rearwardly with the bar 44. The connecting member slots 74 that receive the rod 76 allow the connecting members 64 to shift and pivot relative to the rod 76 as the front portion 68 of the connecting members 64 shift upwardly with the bar 44. The slots 7 in the connecting members 64 therefore prevent the connecting members 64 from blocking the upward movement of the rear 60 of the deck 20 over bumpy ground.

Furthermore, as the rear 60 of the deck 20 shifts upwardly to ride over a bump, the protruding member 84 and second linkage 82 shift upwardly. The slots 74 allow the connecting members 64 to pivot and slide relative to the rod 76 in order to accommodate the upward shifting of the protruding member 84 and second linkage 82 as the rear 60 of the deck 20 encounters bumps. The connecting member slots 74 therefore allow the connecting members 64 to shift such that the protruding member 84 and second linkage 82 can shift upwardly and not block the upward shifting of the rear 60 of the deck 20. A lost motion coupling could be provided between the second linkage 82 and the protruding member 84, such as a slotted opening defined in the protruding member 84 for receiving the second linkage 82. As the rear 60 of the deck 20 would shift upwardly to ride over bumps, the slot would allow the protruding member 82 to shift upwardly relative to the second linkage 82. The slot would therefore insure that the protruding member 84 would not push the second linkage 82 into the bell crank 78 and block the upward shifting of the rear 60 of the deck 20. Also, as the rear 60 of the deck 20 would shift upwardly, the front portion of the first linkage member 80 would move with the finger member 52 such that the bell crank 78 might pivot about its pin connection with the connecting members 64. However, since the second linkage member 82 would be free to move within the slotted opening in the protruding member 84, pivoting of the bell crank 78 would not result in any shifting of the rear 60 of the deck 20.

The present invention therefore provides a walk behind mower 10 having a mechanism for adjusting the height of the mower deck 20 from a single station without requiring the operator to physically lift the deck by hand, and such that the deck 20 remains generally level regardless of the cutting height the operator selects. The operator is able to infinitely adjust the height of the deck 20 without the use of tools. In addition, the height adjustment mechanism of the present invention is compact such that the deck 20 can fit beneath fences and bushes to facilitate trimming operations. The present invention also provides an anti-scalp feature such that the rear portion 60 of the deck 20 can rise up over irregular ground conditions.

I claim:

1. A mechanism as used in the mowing of vegetation, comprising:
   a base unit;
   at least one ground engaging wheel supporting the base unit;
   a frame fixed to the base unit, said frame and base unit being rigid with respect to relative movement about a transversely extending axis;
   at least one ground engaging wheel for supporting the frame;
   a deck within which vegetation may be cut, said deck being carried by the frame and having first and second portions;
   means for selectively adjusting the height of the first portion of the deck above the ground without altering the height of the frame;
   a bell crank means coupling the first deck portion adjustment means with the second portion of the deck for adjusting the height of the second portion of the deck, said bell crank means being adapted to shift vertically as the height of the first portion of the deck is adjusted.

2. A mechanism as used in the mowing of vegetation, comprising:
   a base unit;
   at least one ground engaging wheel supporting the base unit;
   a frame fixed to the base unit, said frame and base unit being rigid with respect to relative movement about a transversely extending axis;
   at least one ground engaging wheel for supporting the frame;
   a deck within which vegetation may be cut, said deck being carried by the frame and having first and second portions;
   means for selectively adjusting the height of the first portion of the deck above the ground without altering the height of the frame;
   a bell crank means coupling the fist deck portion adjustment means with the second portion of the deck for adjusting the height of the second portion of the deck, said bell crank means being adapted to shift vertically as the height of the first portion of the deck is adjusted, said bell crank means further comprises:
   a connecting member having firs and second portions, said first portion being swingably carried by the first portion of the deck, and said second portion being slidably and swingably coupled to the frame such that said connecting member shifts vertically with respect to its connection with the frame as the height of the first portion of the deck is adjusted;
   a bell crank swingably carried by the connecting member, said bell crank being vertically shift able with the connecting member;
   a first linkage connecting the first portion of the deck to the bell crank for swinging the bell crank about its connection with the connecting member as the height of the first portion of the deck is adjusted;
   a second linkage connecting the second portion of the deck to the bell crank for raising the lowering the second portion of the deck as the bell crank swings about its connection with the connection member.

3. The invention as defined in claim 2 wherein the second portion of the connecting member defines a slotted opening for slidably receiving a portion of the frame, said connecting member being shiftable along its longitudinal axis and relative to the frame as the connecting member swings about the portion of the frame received by the slot.

4. The invention as defined in claim 3 and further comprising a rotatable crank handle coupled with the first deck portion adjustment means for selectively adjusting the height of the first portion of the deck.

5. The invention as defined in claim 2, wherein the first deck portion adjustment means further comprises:
   a first support member swingably coupled to the frame;
   a shaft pivotally coupled with the deck and rigidly fixed to a portion of the first support member spaced from the first support member's pivotal coupling with the frame, said shaft being pivotable about its longitudinal axis;
   means for selectively pivoting the shaft relative to the deck, whereby the height of the first portion of the deck is adjusted.

6. The invention as defined in claim 5, wherein the pivoting means further comprises a rotatable crank handle adapted to shift the rotational position of the shaft.

7. The invention as defined in claim 6 wherein a second support member is pivotally coupled between the deck and frame in parallel relation to the first support member to form a four-bar linkage between the deck and the frame.

8. The invention as defined in claim 7, wherein:
the ground engaging wheel that supports the frame further comprises a caster wheel;
a pin connection couples the caster wheel to the frame, and
the first and second support members are pivotally coupled to the caster wheel.

9. The invention as defined in claim 8, and further comprising at least one wheel mounted to the second portion of the deck for engaging the ground as the second portion of the deck encounters irregularities in ground conditions to swing the deck about the pin connection between the caster wheel and frame.

10. The invention as defined in claim 9, wherein the second linkage is coupled to the second portion of the deck by a lost motion coupling, said second portion of the deck being vertically shiftable as the second portion of the deck encounters irregularities in ground conditions.

11. The invention as defined in claim 10, wherein the lost motion coupling comprises a slotted protruding member fixed to the second portion of the deck, and within which the second linkage is slidably received for permitting the second portion of the deck to shift vertically as the second portion of the deck encounters irregularities in ground conditions.

12. The invention as defined in claim 5, and further comprising:
an arm member fixed for rotation with the shaft;
a rotatable crank handle coupled with the arm member and adapted to selectively swing the arm about the longitudinal axis of the shaft, whereby the height of the first portion of the deck is adjusted.

13. The invention as defined in claim 12, wherein the first linkage couples the bell crank with the arm member.

14. A mechanism for adjusting the height of a mower deck having first and second portions, comprising:
a base unit having at least one ground engaging wheel;
a frame coupled to the base unit, said frame and base unit being rigid with respect to relative movement about a transversely extending axis;
at least one wheel for supporting the frame;
means for selectively adjusting the height of the first portion of the mower deck without altering the height of the frame above the ground;
a connecting member having first and second portions, said first portion of the connecting member being carried for vertical shifting with the mower deck's first portion, said second portion of the connecting member being slidably and pivotally carried by the frame;
a bell crank means pivotally carried between the connecting member's first and second portions for vertically shifting with the connecting member, said bell crank means being coupled between the first deck portion height adjustment means and the second portion of the deck for adjusting the height of the second portion of the deck as the bell crank pivots.

15. A mechanism for adjusting the height of a mower deck having first and second portions, comprising:
a base unit having at least one ground engaging wheel;
a frame coupled to the base unit, said frame and base unit being rigid with respect to relative movement about a transversely extending axis;
at least one wheel for supporting the frame;
means for selectively adjusting the height of the first portion of the mower deck without altering the height of the frame above the ground;
a connecting member having first and second portions, said first portion of the connecting member being carried for vertical shifting with the mower deck's first portion, said second portion of the connecting member being slidably and pivotally carried by the frame;
a bell crank means pivotally carried between the connecting member's first and second portions for vertically shifting with the connecting member, said bell crank means being coupled between the first deck portion height adjustment means and the second portion of the deck for adjusting the height of the second portion of the deck as the bell crank pivots;
a first linkage connecting the first deck portion height adjustment means to the bell crank for swinging the bell crank about its connection with the connecting member as the height of the first portion of the deck is adjusted;
a second linkage connecting the second portion of the deck to the bell crank and operative to raise and lower the second portion of the deck as the bell crank swings and shifts vertically;
the second portion of the connecting member defines a slotted opening for slidably receiving a portion of the frame such that said connecting member is shiftable along its longitudinal axis as it swings about its connection with the frame;
a four bar linkage between the firs portion of the deck and the frame;
means for pivoting the four bar linkage to adjust the height of the first portion of the deck.

16. The invention defined in claim 14, wherein:
the wheel supporting the frame further comprises a caster wheel;
a pin connection couples the caster wheel to the frame, and
a four bar linkage couples the deck to the caster wheel.

17. A mechanism as used in the mowing of vegetation, comprising:
a base unit;
at least one ground engaging wheel supporting the base unit;
a frame fixed to the base unit, said frame and base unit being rigid with respect to relative movement about a transversely extending axis;
at least one ground engaging wheel for supporting the frame;
a deck within which vegetation may be cut, said deck being carried by the frame and having first and second portions;
means for selectively adjusting the height of the first portion of the deck above the ground without altering the height of the frame;
link means coupled with the second portion of said deck;
connecting member means having a first portion being coupled with the first portion of said deck and a second portion being coupled with the frame and including lost motion means permitting limited relative movement between the frame and said deck;

bell crank means carried by the connecting member means, said bell crank means being spaced from the first portion of said connecting member means and coupled with the link means and the means for adjusting the height of the first portion of the deck, whereby adjustment of the first portion of the deck causes the bell crank means to correspondingly raise or lower the link means and second portion of said deck simultaneously.

18. The invention defined in claim 17 wherein the bell crank means includes a bell crank pivotally supported by the connecting member means and vertically movable with the connecting member means as the height of the first portion of the deck is adjusted.

19. The invention defined is claim 17, wherein the lost motion means permits limited fore and aft movement of the first portion of the deck with respect to the frame as the height of said first portion of the deck is adjusted.

20. The invention defined in claim 18, wherein the pivotal support for the bell crank is proportionately adjusted vertically as the first portion of the deck is adjusted vertically.

* * * * *

UNITED STATES PATENT AND TRADEMARK OFFICE
CERTIFICATE OF CORRECTION

PATENT NO. : 5,065,568

DATED : November 19, 1991

INVENTOR(S) : Stephen A. Braun, et al

It is certified that error appears in the above-identified patent and that said Letters Patent is hereby corrected as shown below:

Column 8, line 14, delete "fist" and insert therefor -- first -- ; line 21, delete "firs" and insert therefor -- first -- ; line 37 delete "the" (second occurrence) and insert therefor -- and -- ;

Column 10, line 37, delete "firs" and insert therefor -- first -- .

Column 12, line 4, delete "is" and insert therefor -- in -- .

Signed and Sealed this

Eleventh Day of May, 1993

Attest:

MICHAEL K. KIRK

Attesting Officer

Acting Commissioner of Patents and Trademarks